(12) United States Patent
Sun et al.

(10) Patent No.: US 11,536,242 B1
(45) Date of Patent: Dec. 27, 2022

(54) ADJUSTABLE MULTI-FUNCTIONAL BOTTOM-HINGED FLAP-TYPE WAVE ENERGY UTILIZATION DEVICE AND CONTROL METHOD THEREFOR

(71) Applicant: JIANGSU UNIVERSITY OF SCIENCE AND TECHNOLOGY, Jiangsu (CN)

(72) Inventors: Shiyan Sun, Jiangsu (CN); Meng Wang, Jiangsu (CN); Jie Cui, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 0 days.

(21) Appl. No.: 17/556,951

(22) Filed: Dec. 20, 2021

(30) Foreign Application Priority Data

Jul. 16, 2021 (CN) .......................... 202110805146.3

(51) Int. Cl.
*F03B 13/20* (2006.01)
*F03B 13/18* (2006.01)

(52) U.S. Cl.
CPC ............ *F03B 13/20* (2013.01); *F03B 13/182* (2013.01); *F05B 2270/1077* (2020.08)

(58) Field of Classification Search
CPC . F03B 13/20; F03B 13/182; F05B 2270/1077
See application file for complete search history.

(56) References Cited

U.S. PATENT DOCUMENTS

| 4,400,940 | A  | * | 8/1983 | Watabe | F03B 13/182 417/330 |
| 7,834,474 | B2 | * | 11/2010 | Whittaker | F03B 13/182 290/53 |
| 8,004,105 | B2 | * | 8/2011 | Whittaker | F03B 13/182 290/53 |
| 9,902,467 | B2 | * | 2/2018 | Lin | B63B 21/50 |

(Continued)

FOREIGN PATENT DOCUMENTS

CN 103895823 A * 7/2014

OTHER PUBLICATIONS

CN103895823 Translation, Chen M, Jul. 2014.*

*Primary Examiner* — Jesse S Bogue
(74) *Attorney, Agent, or Firm* — JCIP Global Inc.

(57) ABSTRACT

An adjustable multi-functional bottom-hinged flap-type wave energy utilization device includes at least three wave energy conversion devices arranged in parallel and with adjustable spacing. Each wave energy conversion device includes a wave energy conversion component, a direction adjustment component for adjusting a wave-facing direction of the wave energy conversion component, and a height adjustment component for adjusting a height of the wave energy conversion component. The wave energy conversion component includes a mounting base plate, a transmission shaft arranged on the mounting base plate, a wave energy flap that can drive the transmission shaft to rotate, a generator connected to the transmission shaft, a hydraulic oil cylinder positioned on a back surface of the flap for pushing the flap to reset, and a wave monitor arranged on the mounting base plate for monitoring a draught and a wave direction angle of the flap.

10 Claims, 8 Drawing Sheets

(56) References Cited

U.S. PATENT DOCUMENTS

| | | | | |
|---|---|---|---|---|
| 2008/0018113 A1* | 1/2008 | Tal-or | ................... | F03B 13/182 |
| | | | | 290/53 |
| 2008/0191485 A1* | 8/2008 | Whittaker | ............. | F03B 13/182 |
| | | | | 290/53 |
| 2011/0298215 A1* | 12/2011 | Wille | ..................... | H02N 2/185 |
| | | | | 310/339 |
| 2011/0316276 A1* | 12/2011 | Crowley | ............... | F03B 13/182 |
| | | | | 290/42 |
| 2014/0145443 A1* | 5/2014 | Espedal | ............... | F03B 13/182 |
| | | | | 290/53 |
| 2014/0196451 A1* | 7/2014 | Bateman | ............... | F03B 13/182 |
| | | | | 60/499 |
| 2015/0082785 A1* | 3/2015 | Rohrer | .................. | F03B 13/186 |
| | | | | 60/500 |
| 2017/0043843 A1* | 2/2017 | Lin | .......................... | F15B 11/08 |
| 2018/0050764 A1* | 2/2018 | Moffat | .................... | F03B 13/20 |

* cited by examiner

ADJUSTABLE MULTI-FUNCTIONAL BOTTOM-HINGED FLAP-TYPE WAVE ENERGY UTILIZATION DEVICE AND CONTROL METHOD THEREFOR

CROSS-REFERENCE TO RELATED APPLICATION

This application claims the priority benefit of China application serial no. 202110805146.3, filed on Jul. 16, 2021. The entirety of the above-mentioned patent application is hereby incorporated by reference herein and made a part of this specification.

BACKGROUND

Technical Field

The present invention relates to a wave energy utilization device, in particular to an adjustable multi-functional bottom-hinged flap-type wave energy utilization device and a control method therefor.

Description of Related Art

Non-renewable energy sources account for a significant portion of the energy sources used by humans, such as coal, crude oil, and natural gas. Traditional energy source has characteristics of being non-renewable and polluting to the environment, and as time goes by, the global energy reserves are continuously reduced and exploitation difficulty is gradually increased. At present, it is urgent to develop new energy sources, and wave energy brought by the ocean covering most Earth's surface is a new energy source that cannot be neglected. Generally, wave energy needs to experience three-stage conversion, namely, energy collection device conversion, intermediate conversion device conversion and power generation device conversion, wherein the first stage conversion is the most important. The bottom-hinged flap-type wave energy collection device in the existing wave energy collection device emerges from various wave energy collection devices for its outstanding advantages of high-efficiency, low cost and high reliability. Moreover, it has a very excellent wave-absorbing performance besides high wave energy-collection efficiency.

The purpose of initially researching, developing and then applying the bottom-hinged flap-type wave energy conversion device at present is to improve the efficiency of wave energy collection and reduce the economic cost of wave energy collection. Since the 1990s, the UK has realized the commercialization of wave energy power generation. In recent years, coastal countries have vigorously developed wave energy conversion devices with the development of technology. However, the defects of wave energy flap in traditional bottom-hinged flap-type wave energy conversion device, such as an unadjustable draught and an unadjustable direction, have greatly affected wave energy utilization efficiency. What's worse, the wave-absorbing function of the wave energy conversion devices arranged in parallel cannot be utilized to the maximum, coasts cannot be protected, coast structures are damaged, and the normal use of coastal devices is also affected.

Therefore, it is desirable to solve the above problems.

SUMMARY

Objective: The present invention aims to provide an adjustable multi-functional bottom-hinged flap-type wave energy utilization device that can quickly adjust the spacing between adjacent wave energy flaps, the height of the wave energy flaps and the wave-facing direction.

Technical scheme: In order to achieve the above objective, the present invention discloses an adjustable multi-functional bottom hinge flap-type wave energy utilization device, which comprises at least 3 wave energy conversion devices arranged in parallel and with adjustable spacing. The wave energy conversion devices each comprise a wave energy conversion component for converting wave kinetic energy into electric energy, a direction adjustment component for adjusting the wave-facing direction of the wave energy conversion component and a height adjustment component for adjusting the height of the wave energy conversion component sequentially arranged from top down. Wherein the wave energy conversion component comprises a mounting base plate, a transmission shaft with two ends thereof arranged on the mounting base plate through transmission shaft supports, a wave energy flap that arranged vertically through the transmission shaft and can drive the transmission shaft to rotate under the action of wave kinetic energy, a generator connected with the transmission shaft through a first gear set, a hydraulic oil cylinder positioned on the back surface of the wave energy flap and used for pushing the wave energy flap to reset and a wave monitor arranged on the mounting base plate and used for monitoring a draught and a wave direction angle of the wave energy flap.

The first gear set comprises a first gear and a second gear meshed with each other, wherein the first gear is arranged coaxially with the transmission shaft, and the second gear is arranged coaxially with an input shaft of the generator.

Preferably, the wave energy conversion component further comprises a sealing box, wherein the first gear set and the generator are positioned in the sealing box, and the transmission shaft extends into the sealing box to be connected with the first gear set.

Moreover, the direction adjustment component comprises a shell body positioned on the height adjustment component, a first servo motor fixed on the shell body, a worm positioned in the shell body and connected with an output shaft of the first servo motor through a second gear set, a third gear positioned in the shell body and meshed with the worm, and a chuck extending into the third gear and moving synchronously with the third gear, wherein the chuck is connected with the wave energy conversion component.

Furthermore, the second gear set comprises a fourth gear and a fifth gear positioned in the shell body and meshed with each other, wherein the fourth gear is coaxially arranged with an output shaft of the first servo motor, and the fifth gear is coaxially arranged with the worm.

Preferably, the height adjustment component comprises an upper base plate and a lower base plate used for setting the direction adjustment component, a motor mounting base positioned on the lower base plate, a second servo motor fixed on the motor mounting base, a lead screw connected with an output shaft of the second servo motor through a coupling and vertically arranged, a lead screw nut positioned on a lower surface of the upper base plate and matched with the lead screw, and shearing and inserting type lifting components symmetrically arranged between the upper base plate and the lower base plate.

Moreover, the shearing and inserting type lifting components each comprise an upper slide rail fixed on the upper base plate, a lower slide rail correspondingly arranged on the lower base plate, roller members that are positioned in the upper slide rail and the lower slide rail and can move back and forth, and a shearing and inserting type support connected with the roller members and arranged in a crossed manner.

Furthermore, a hydraulic oil cylinder with adjustable spacing is connected between the adjacent wave energy conversion devices.

Preferably, the direction adjustment component controls the wave energy conversion component to rotate rightwards until a wave direction angle between the wave energy flap and waves is equal to a set angle when the wave monitor monitors that the wave direction angle is larger than the set angle, the direction adjustment component controls the wave energy conversion component to rotate leftwards until the wave direction angle between the wave energy flap and the waves is equal to the set angle when the wave monitor monitors that the wave direction angle is smaller than the set angle, the height adjustment component controls the wave energy conversion component to rise until the draught of the wave energy flap is equal to a set value when the wave monitor monitors that the draught of the wave energy flap is smaller than the set value, the height adjustment component controls the wave energy conversion component to fall until the draught of the wave energy flap is equal to the set value when the wave monitor monitors that the draught of the wave energy flap is larger than the set value, and the height adjustment component controls the wave energy conversion component to rise until the bottom of wave energy flap is above the water surface when facing extreme sea conditions, which are judged by whether the wave energy flap encounters a danger from slamming loads of bigger waves.

The present invention also discloses a control method for the adjustable multi-functional bottom-hinged flap-type wave energy utilization device, wherein the control method comprises the following steps.

Step (1): Placing the adjustable multi-functional bottom-hinged flap-type wave energy utilization device in a working sea area with a water depth of 10-20 m, and starting the wave monitor to monitor a draught and a wave direction angle of the wave energy flap.

Step (2): Adjusting the hydraulic oil cylinder to increase the spacing between the front wave energy conversion device and the rear wave energy conversion device when a wave height or a wave length is larger, and adjusting the hydraulic oil cylinder to reduce the spacing between the front wave energy conversion device and the rear wave energy conversion device when the wave height or the wave length is smaller.

Step (3): Starting the first servo motor of the direction adjustment component and controlling the chuck to rotate with the cooperation of the second gear set, the worm and the third gear so as to drive the wave energy conversion component to rotate if the wave direction angle is larger than a set angle, wherein the wave energy flap is controlled to rotate rightwards until the wave direction angle of the wave energy flap is equal to the set angle.

Step (4): Starting the first servo motor of the direction adjustment component and controlling the chuck to rotate with the cooperation of the second gear set, the worm and the third gear so as to drive the wave energy conversion component to rotate if the wave direction angle is smaller than the set angle, wherein the wave energy conversion component rotates leftwards until the wave direction angle of the wave energy flap is equal to the set angle.

Step (5): Determining, by the wave monitor, whether the draught of the wave energy flap is a set value or not, and starting the second servo motor of the height adjustment component and lowering the wave energy converting component until the draught of the wave energy flap is the set value with the cooperation of a lead screw and a lead screw nut if the draught of the wave energy flap is larger than the set value.

Step (6): Starting the second servo motor of the height adjustment component and lifting the wave energy converting component by the height adjustment component with the cooperation of the lead screw and the lead screw nut until the draught of the wave energy flap is the set value if the draught of the wave energy flap is smaller than the set value.

Step (7): Starting the second servo motor of the height adjustment component, and lifting the wave energy conversion component by the height adjustment component with the cooperation of the lead screw and the lead screw nut until the wave energy flap is higher than the free liquid level under a rough sea condition.

Beneficial effects are described as follows. The present invention has the following remarkable advantages compared with the prior art.

(1) The draught of the wave energy flap can be adjusted through the height adjustment component, when the free liquid level rises under flood tide, the height adjustment component works, the wave energy conversion component rises, and the free liquid level can be ensured to be stabilized at the middle position of the height of the wave energy flap. Under ebb tide, the height is lowered through the height adjustment component until the draught liquid level of the wave energy flap is a middle position of the height of the wave energy flap.

(2) The wave energy conversion component can be lifted through the height adjustment component when facing extreme sea conditions, so that the structure of the wave energy conversion device is prevented from being damaged.

(3) The direction of the wave energy flap can be adjusted through the direction adjustment component, when the wave energy flap faces oblique wave conditions, the direction adjustment component works to adjust the direction of the wave energy flap, so that the wave energy flap always keeps an included angle of 180° with the wave direction.

(4) The optimal wave-absorbing effect can be achieved while the aim of improving the wave energy collection efficiency can be fulfilled by adjusting the spacing between the devices through the hydraulic oil cylinder when facing different sea conditions.

DESCRIPTION OF THE EMBODIMENTS

The technical scheme of the present invention is further described below with reference to the drawings.

Figure 1:
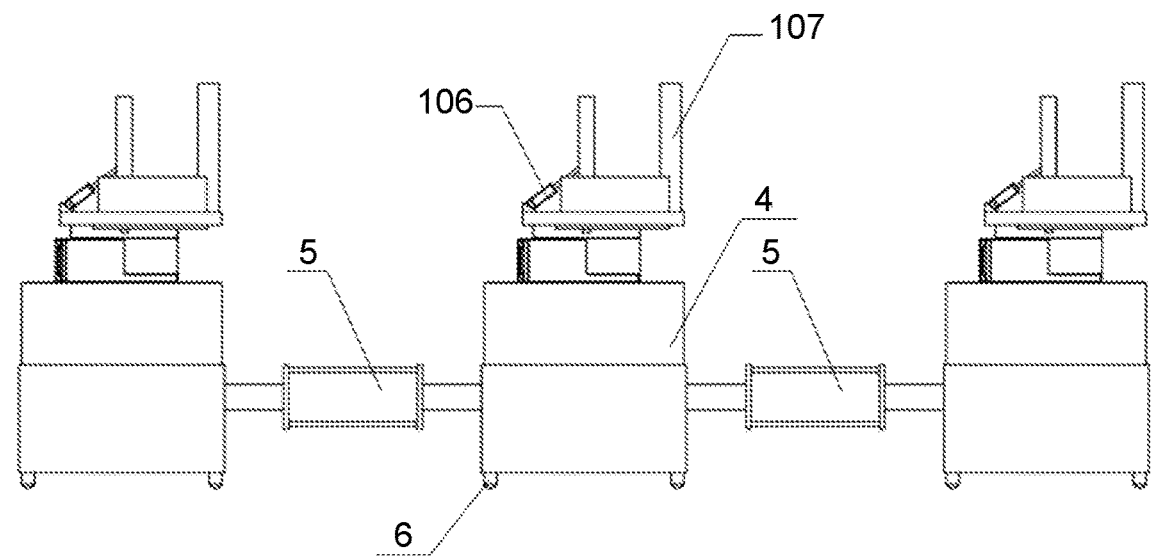
FIG. 1 is an overall schematic diagram of the present invention.

As shown in FIG. 1, the adjustable multi-functional bottom-hinged flap-type wave energy utilization device disclosed herein comprises at least three wave energy conversion devices arranged in parallel and with adjustable spacing, hydraulic oil cylinders 5 with adjustable spacing are connected between adjacent wave energy conversion devices, and the adjustable range of the hydraulic oil cylinders is 1-2 m. According to the present invention, the spacing between the devices is adjusted through the hydraulic oil cylinders 5, so that the optimal wave-absorbing effect is achieved, and the purpose of wave-absorbing and coast protection is achieved. Meanwhile, the aim of improving the wave energy collection efficiency is fulfilled.

Figure 2:
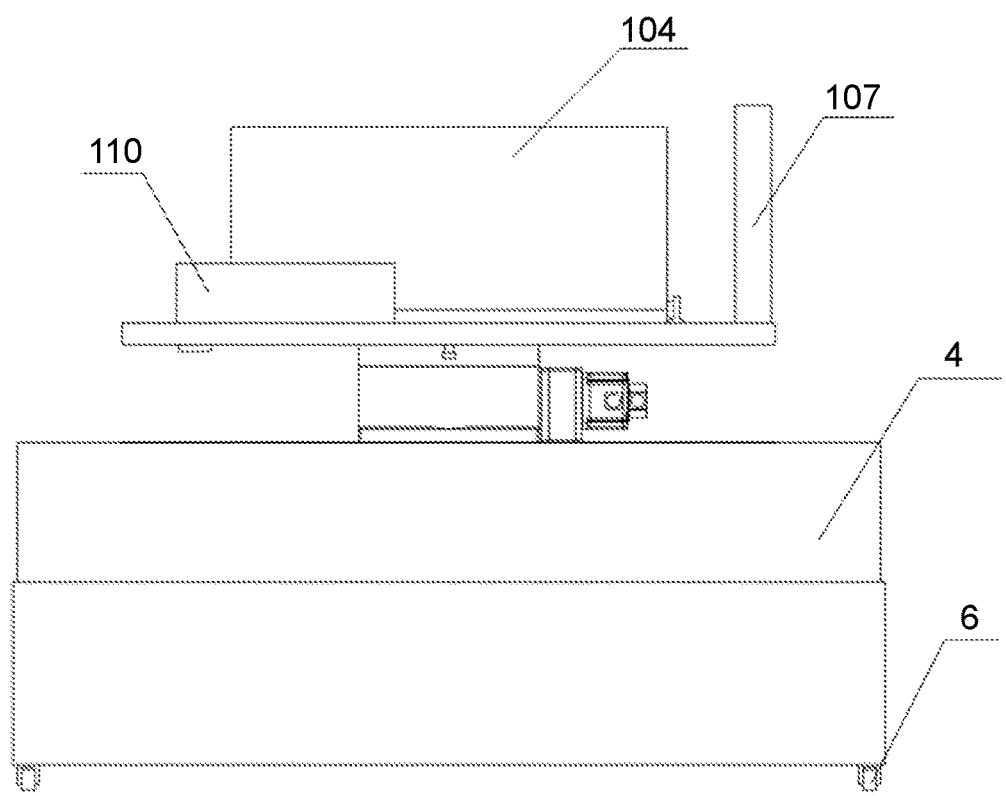
FIG. 2 is a schematic diagram of the structure of the wave energy conversion device according to the present invention.
Figure 3:
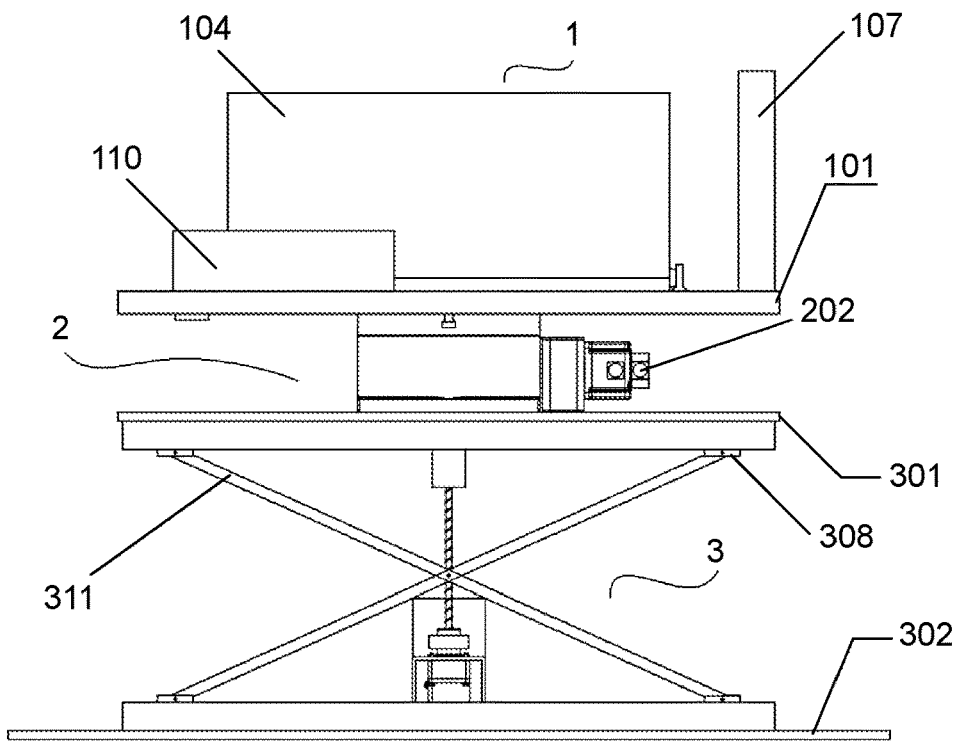
FIG. 3 is a schematic diagram of the structure of the internal mechanism according to the present invention.
Figure 4:
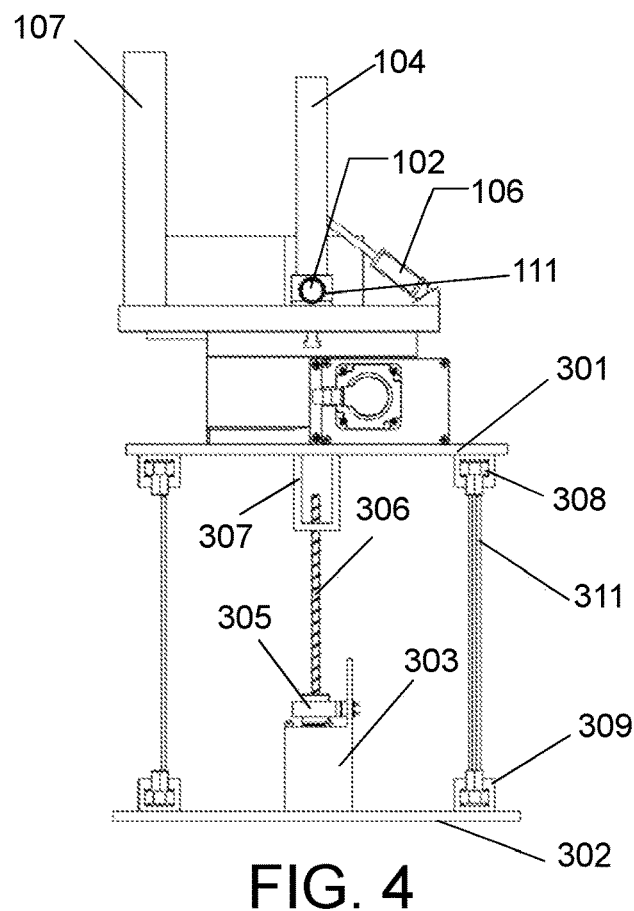
FIG. 4 is a side view of the internal mechanism according to the present invention.
Figure 13:
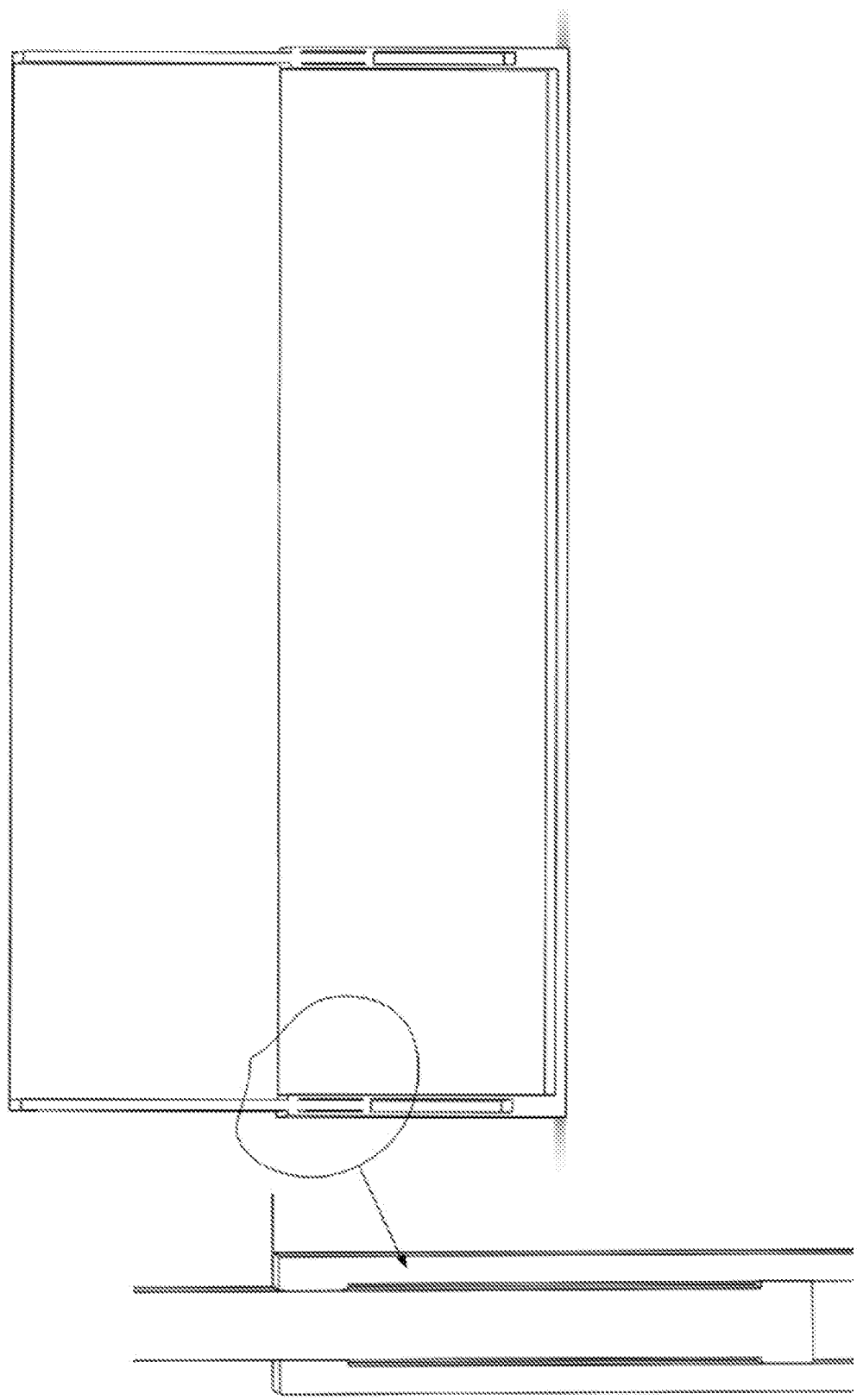
FIG. 13 is a schematic diagram of the internal structure of the working box according to the present invention.

As shown in FIGS. 2, 3 and 4, the wave energy conversion device disclosed herein comprises a wave energy conversion component 1, a direction adjustment component 2, a height adjustment component 3 and a working box 4, wherein the wave energy conversion component 1, the direction adjustment component 2 and the height adjustment component 3 are sequentially arranged from top down, the direction adjustment component 2 and the height adjustment component 3 are both positioned in the working box 4, wheels 6 are arranged under the working box, and inside of the working box 4, the height of the working box can be adjusted through slide rails and slide blocks, as shown in FIG. 13.

Figure 5:
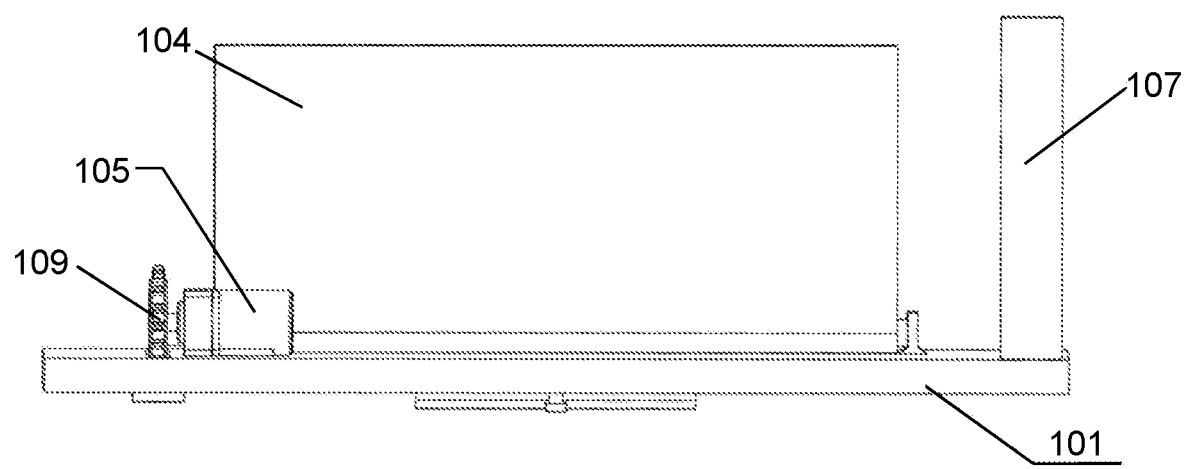
FIG. 5 is a front view of the wave energy conversion component according to the present invention.
Figure 6:
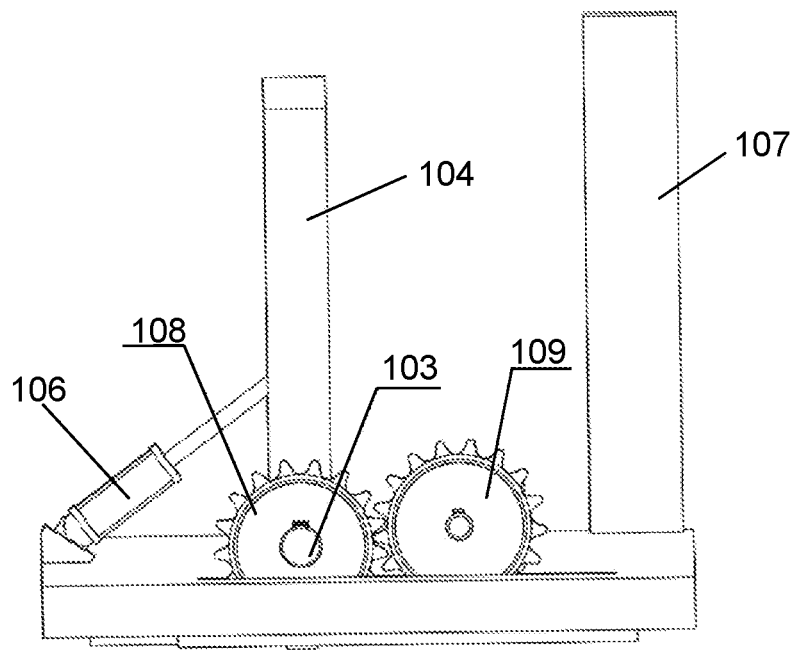
FIG. 6 is a side view of the wave energy conversion component according to the present invention.

As shown in FIGS. 5 and 6, the wave energy conversion component 1 is used for converting wave kinetic energy into electric energy, and the wave energy conversion component 1 comprises a mounting base plate 101, transmission shaft supports 102, a bearing 111, a transmission shaft 103, a wave energy flap 104, a generator 105, a hydraulic oil cylinder 106, a wave monitor 107, a first gear 108, a second gear 109, and a sealing box 110. The two transmission shaft supports 102 are arranged at two ends of the transmission shaft 103, the bearing 111 is arranged between the transmission shaft supports 102 and the transmission shaft 103, the bearing 111 can ensure the transmission shaft 103 to rotate smoothly, and the transmission shaft supports 102 are fixed on the mounting base plate 101. The wave energy flap 104 is arranged vertically through the transmission shaft 103 facing waves frontally, and the wave energy flap 104 drives the transmission shaft 103 to rotate together under the action of wave kinetic energy, wherein the wave energy flap is a bottom-hinged flap-type wave energy flap, and the height of the wave energy flap is 2 m generally. The transmission shaft 103 and the first gear 108 are coaxially arranged, the first gear 108 and the second gear 109 are meshed with each other to form a first gear set, the second gear 109 and an input shaft of the generator 105 are coaxially arranged, the first gear set and the generator 105 are positioned in the sealing box 110, the transmission shaft 103 extends into the sealing box 110 to be connected with the first gear set, and the sealing box can effectively prevent water from entering. When the wave energy flap 104 drives the transmission shaft to rotate together under the action of wave kinetic energy, the power is transmitted to the generator through the mutual meshing of the first gear and the second gear, converting wave kinetic energy into electric energy. The second gear 109 also rotates one revolution for each revolution of the first gear 108. The hydraulic oil cylinder 106 is positioned on the back surface of the wave energy flap and provides a force for the wave energy flap to help it relocate at a position perpendicular to a horizontal plane after rotation when the wave energy flap rocks backwards under the action of waves. The wave monitor 107 is arranged on the mounting base plate, the wave monitor 107 is positioned in front-left of the wave energy flap, and the wave monitor 107 is used for monitoring a draught and a wave direction angle of the wave energy flap. The direction adjustment component controls the wave energy conversion component to rotate rightwards until a wave direction angle between the wave energy flap and waves is equal to a set angle when the wave monitor disclosed herein monitors that the wave direction angle is larger than the set angle, the direction adjustment component controls the wave energy conversion component to rotate leftwards until the wave direction angle between the wave energy flap and the waves is equal to the set angle when the wave monitor monitors that the wave direction angle is smaller than the set angle, the height adjustment component controls the wave energy conversion component to rise until the draught of the wave energy flap is equal to a set value when the wave monitor monitors that the draught of the wave energy flap is smaller than the set value, the height adjustment component controls the wave energy conversion component to fall until the draught of the wave energy flap is equal to the set value when the wave monitor monitors that the draught of the wave energy flap is larger than the set value, and the height adjustment component controls the wave energy conversion component to rise until the bottom of wave energy flap is above the water surface when facing extreme sea conditions. For example, the extreme sea conditions include rough sea conditions, which are judged by whether the wave energy flap encounters a danger from slamming loads of bigger waves.

Figure 7:
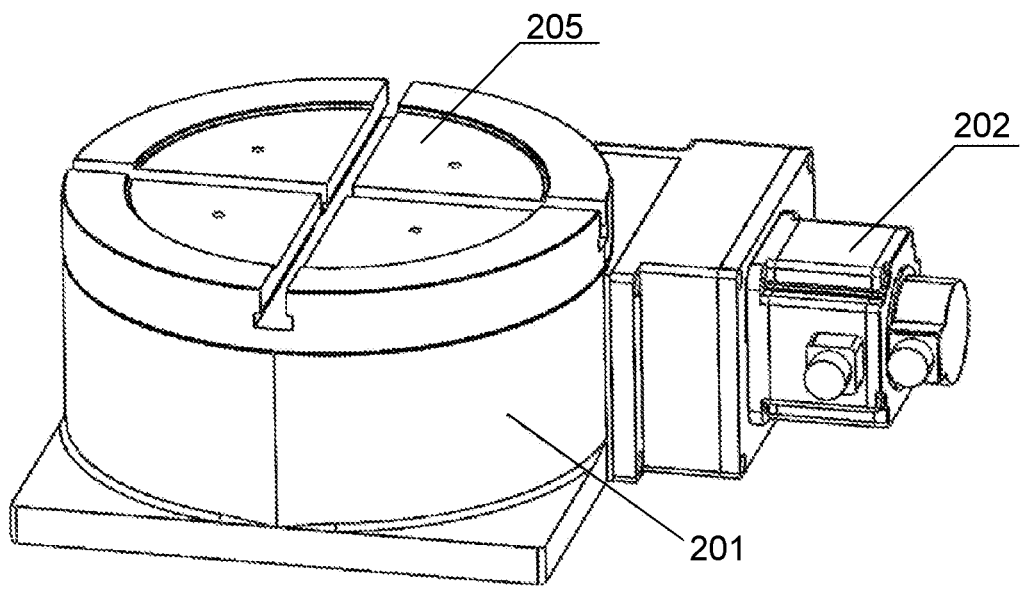
FIG. 7 is a schematic diagram of the structure of the direction adjustment component according to the present invention.
Figure 8:
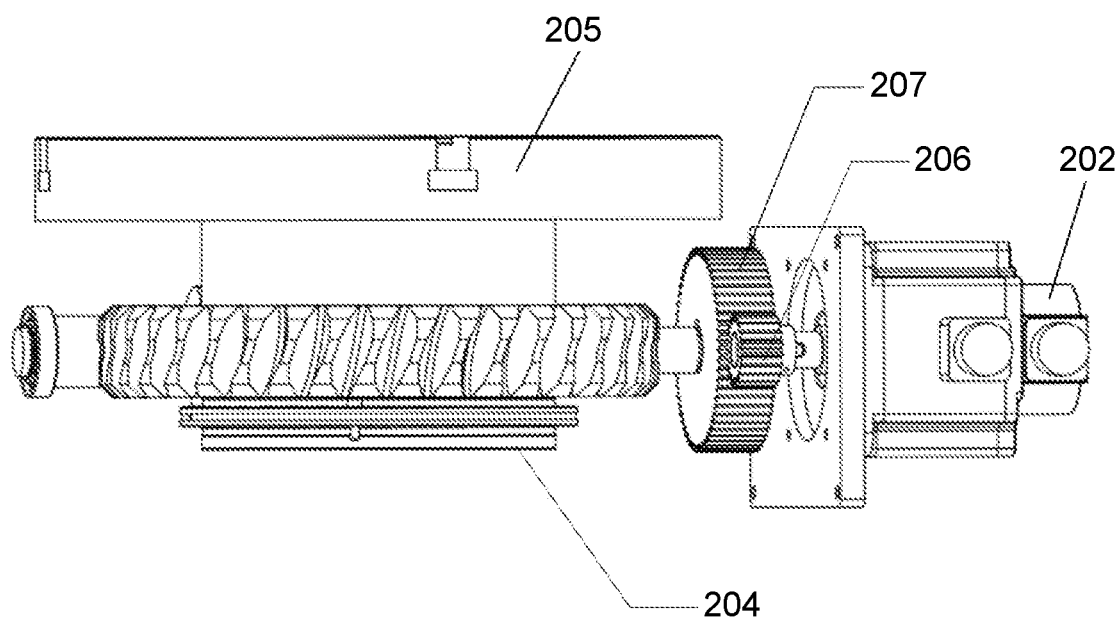
FIG. 8 is a schematic diagram of the internal structure of the direction adjustment component according to the present invention.
Figure 9:
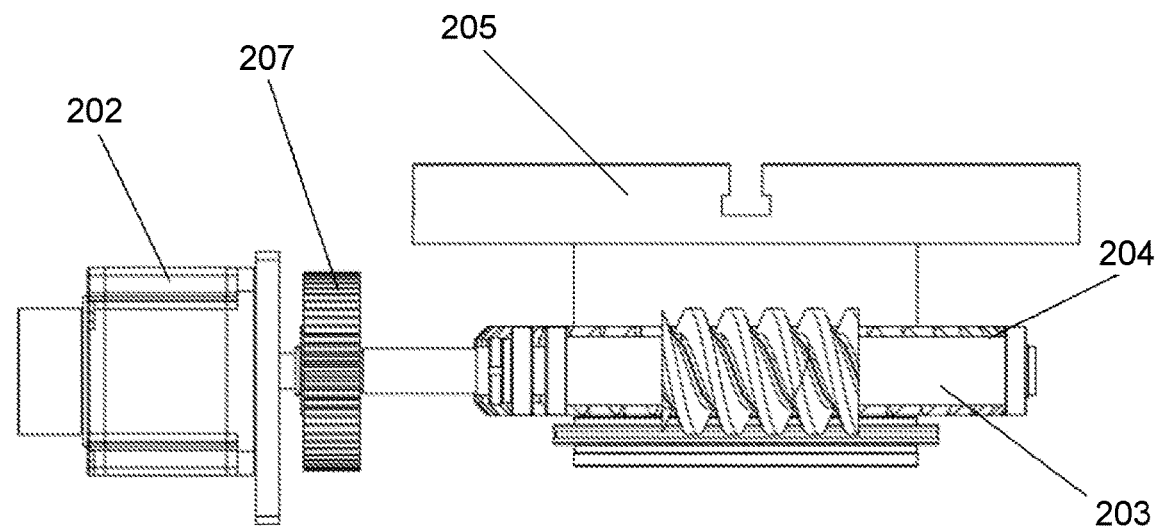
FIG. 9 is a rear view of the internal structure of the direction adjustment component according to the present invention.

As shown in FIGS. 7, 8 and 9, the direction adjustment component 2 is used for adjusting the wave-facing direction of the wave energy conversion component, and the direction adjustment component 2 comprises a shell body 201, a first servo motor 202, a worm 203, a third gear 204, a chuck 205, a fourth gear 206 and a fifth gear 207. The shell body 201 is arranged on the height adjustment component 3, the first servo motor 202 is fixed on the shell body 201, an output shaft of the first servo motor 202 extends into the shell body 201, an output shaft of the first servo motor 202 and the fourth gear 206 are coaxially arranged, the fourth gear 206 and the fifth gear 207 are meshed with each other to form a second gear set, the fourth gear 206, the fifth gear 207, the worm 203 and the third gear 204 are all positioned in the shell body 201, the fifth gear 207 and the worm 203 are coaxially arranged, the third gear 204 is meshed with the worm 203, the chuck 205 extends into the third gear, the chuck 205 and the third gear 204 are coaxially arranged, the chuck 205 and the third gear synchronously move, and the chuck 205 and the mounting base plate 101 of the wave energy conversion component are fixedly connected in a cross fixed mode. The fifth gear 207 rotates one revolution for every 6 revolutions of the fourth gear 206. The first servo motor is started, the rotation direction and the rotation speed of the worm are controlled through the second gear set, the worm and the fifth gear rotate synchronously, and the rotation direction and the rotation speed of the chuck are controlled through the meshing transmission of the worm and the third gear, so that the direction of the wave energy conversion component is controlled through the chuck. The third gear rotates one revolution for every 5.5 revolutions of the worm.

Figure 10:
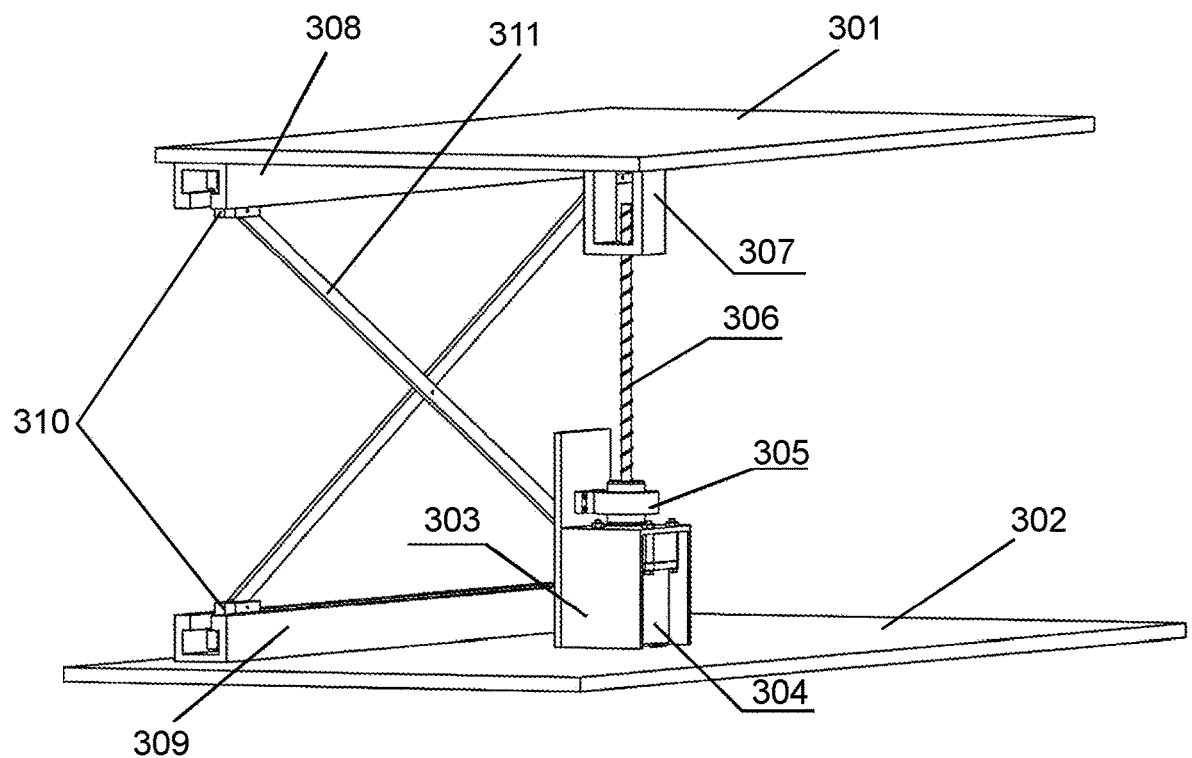
FIG. 10 is a schematic diagram I of the structure of the height adjustment component according to the present invention.
Figure 11:
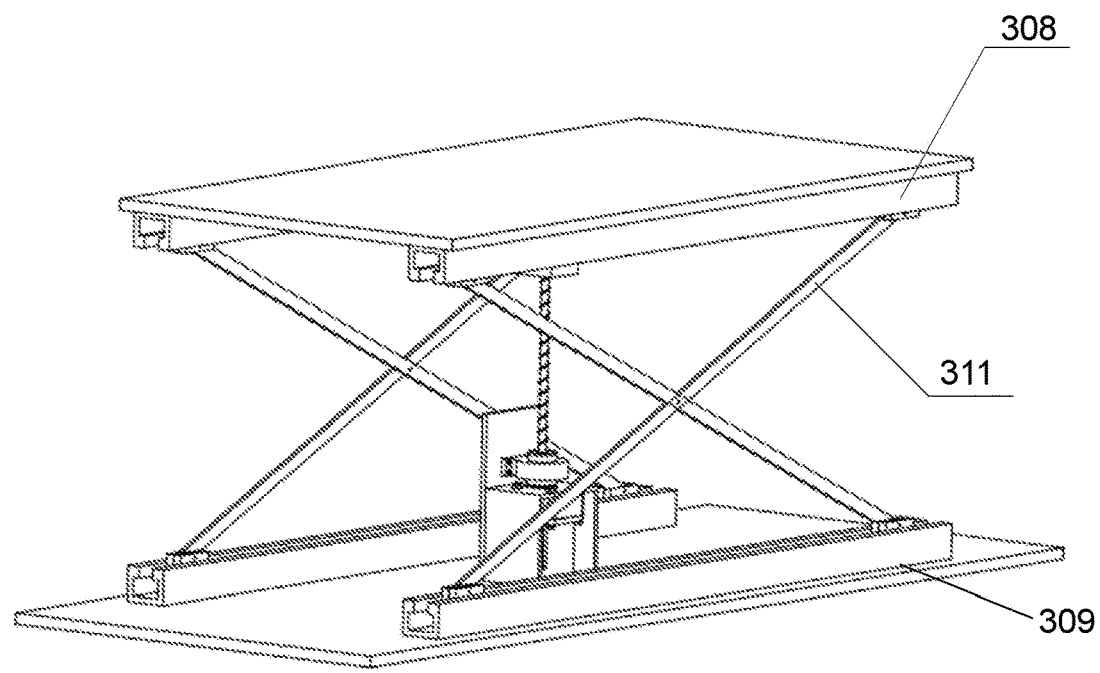
FIG. 11 is a schematic diagram II of the structure of the height adjustment component according to the present invention.
Figure 12:
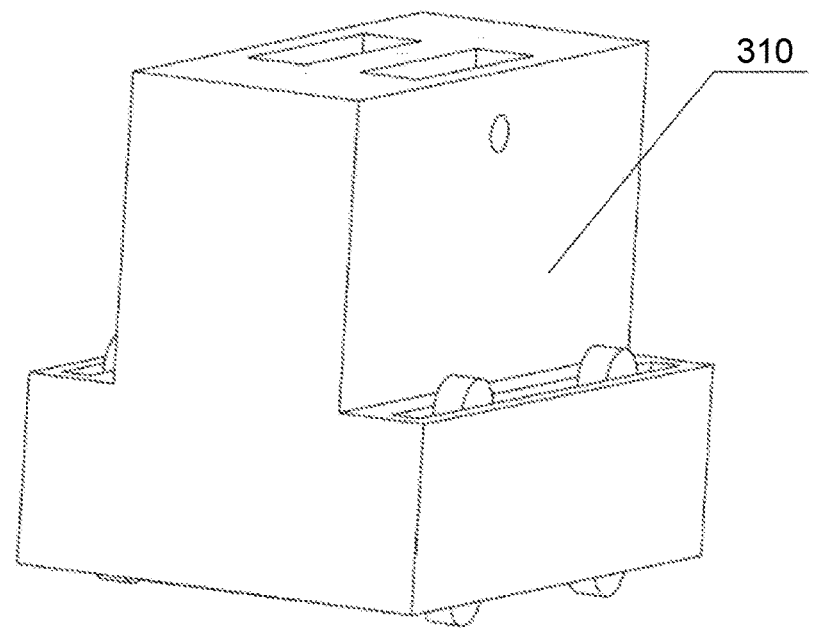
FIG. 12 is a schematic diagram of the structure of the roller according to the present invention.

As shown in FIGS. 10, 11 and 12, the height adjustment component 3 is used for adjusting the height of the wave energy conversion component, the working box has a height adjustable range of 10-20 m, the adjustable multi-functional bottom-hinged flap-type wave energy utilization device is usually arranged near an offshore shore with the water depth of 10-20 m, and the height adjustment component has a height adjustable range of 10-20 m. The height adjustment component 3 comprises an upper base plate 301, a lower base plate 302, a motor mounting base 303, a second servo motor 304, a coupling 305, a lead screw 306, a lead screw nut 307, upper slide rails 308, lower slide rails 309, roller members 310 and shearing and inserting type supports 311. The upper base plate 301 is connected with the shell body 201 of the direction adjustment component for setting the direction adjustment component, and the lower base plate 302 is connected with the working box 4. The motor mounting base 303 is arranged on the lower base plate 302, the second servo motor 304 is fixed on the motor mounting base 303 through bolts, an output shaft of the second servo motor 304 is connected with the lead screw 306 through the coupling 305, the lead screw 306 is vertically arranged, the lead screw nut 307 is arranged on a lower surface of the upper base plate 301, the lead screw nut is arranged through the lead screw 306, and can slide up and down along the lead screw, and the upper base plate 301 is driven to move up and down simultaneously. The shearing and inserting type lifting components are symmetrically arranged between the upper base plate 301 and the lower base plate 302, the shearing and inserting type lifting components each comprise the upper slide rail 308, the lower slide rail 309, the roller members 310 and the shearing and inserting type support 311, wherein the upper slide rail 308 is fixed on the upper base plate, the lower slide rail 309 is correspondingly arranged on the lower base plate, the upper slide rail 308 and the lower slide rail 309 are correspondingly arranged to form a set of slide rail assembly, 2 sets of slide rail assemblies are symmetrically arranged between the upper base plate and the lower base plate, 2 roller members capable of sliding back and forth are arranged in each upper slide rail 308, 2 roller members capable of sliding back and forth are arranged in each lower slide rail 309, the shearing and inserting type support 311 is formed by two long plates which are arranged in a crossed manner, and the crossed position of the 2 long plates is hinged. An upper end of each the shearing and inserting type support 311 is connected with the 2 roller members in the upper slide rail, and a lower end of the shearing and inserting type support 311 is connected with the 2 roller members in the lower slide rail. The second servo motor is started, the lead screw drives the lead screw nut to move up and down and simultaneously drives the upper base plate to move, the shearing and inserting type supports of the shearing and inserting type lifting components move along the upper sliding rails and the lower sliding rails under the action of the roller members when the upper base plate moves up and down, and the shearing and inserting type lifting components can maintain the integral stability of the device. The device is lifted or lowered by 0.1 m for every 3.2 revolutions of the lead screw.

According to the present invention, the working box below the wave energy conversion device is improved, and the direction adjustment component and the height adjustment component are additionally arranged in the working box, so that the draught and the wave-facing direction of the wave energy conversion component can be adjusted, the wave energy flap always keeps 180° with the wave-facing direction, the wave energy collection efficiency is improved, and the defects of poor adaptability and low wave energy collection efficiency of the traditional wave energy conversion device are solved. The draught of the wave energy flap is adjusted through the height adjustment component, the draught of the wave energy flap is kept, and the defect that the draught height of the wave energy flap of traditional wave energy conversion device is unadjustable is solved.

Figure 14:
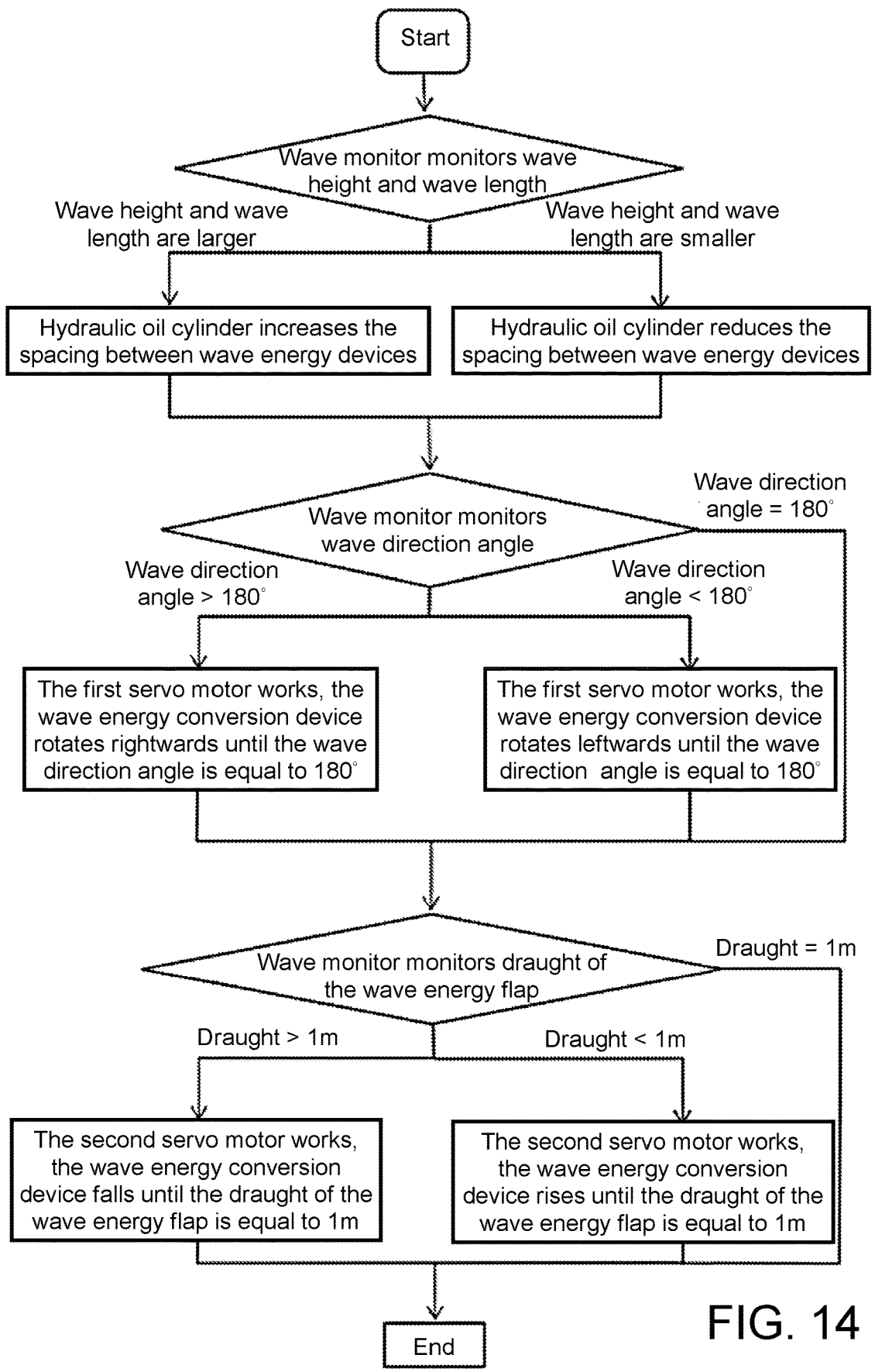
FIG. 14 is a control flowchart of the present invention.

As shown in FIG. 14, the control method for the adjustable multi-functional bottom-hinged flap-type wave energy utilization device disclosed herein comprises the following steps.

Step (1): Placing the adjustable multi-functional bottom-hinged flap-type wave energy utilization device in a working sea area with a water depth of 10-20 m, and starting the wave monitor to monitor a draught and a wave direction angle of the wave energy flap.

Step (2): Adjusting the hydraulic oil cylinder to increase the spacing between the front wave energy conversion device and the rear wave energy conversion device when a wave height or a wave length is larger, and adjusting the hydraulic oil cylinder to reduce the spacing between the front wave energy conversion device and the rear wave energy conversion device when the wave height or the wave length is smaller.

Step (3): Starting the first servo motor of the direction adjustment component and controlling the chuck to rotate with the cooperation of the second gear set, the worm and the third gear so as to drive the wave energy conversion component to rotate if the wave direction angle is larger than a set angle, wherein the wave energy flap is controlled to rotate rightwards until the wave direction angle of the wave energy flap is equal to the set angle.

Step (4): Starting the first servo motor of the direction adjustment component and controlling the chuck to rotate with the cooperation of the second gear set, the worm and the third gear so as to drive the wave energy conversion component to rotate if the wave direction angle is smaller than the set angle, wherein the wave energy conversion component rotates leftwards until the wave direction angle of the wave energy flap is equal to the set angle.

Step (5): Determining, by the wave monitor, whether the draught of the wave energy flap is a set value or not, and starting the second servo motor of the height adjustment component and lowering the wave energy converting component until the draught of the wave energy flap is the set value with the cooperation of a lead screw and a lead screw nut if the draught of the wave energy flap is larger than the set value.

Step (6): Starting the second servo motor of the height adjustment component and lifting the wave energy converting component by the height adjustment component with the cooperation of the lead screw and the lead screw nut until the draught of the wave energy flap is the set value if the draught of the wave energy flap is smaller than the set value.

Step (7): Starting the second servo motor of the height adjustment component, and lifting the wave energy conversion component by the height adjustment component with the cooperation of the lead screw and the lead screw nut until the wave energy flap is higher than the free liquid level under a rough sea condition.

The set angle is 180° and the set value is 1 m in the control method disclosed herein. The wave energy collection efficiency of the wave energy conversion device in work mainly depends on the motion condition of the wave energy flap, while the draught of the wave energy flap and the included angle between the wave energy flap and the waves are main factors affecting the motion amplitude and the frequency of the wave energy flap. The present invention ensures that the wave energy flap always keeps an included angle of 180° with the waves through the direction adjustment component, the draught of the wave energy flap always keeps half of the height of the wave energy flap, that is the draught of the wave energy flap is 1 m when the wave energy flap works, so that the wave energy conversion device can work efficiently when facing flood tide and ebb tide and waves in different directions.

What is claimed is:

1. An adjustable multi-functional bottom-hinged flap-type wave energy utilization device, comprising at least three wave energy conversion devices arranged in parallel and with adjustable spacing, wherein each of the wave energy conversion devices comprises a wave energy conversion component for converting wave kinetic energy into electric energy, a direction adjustment component for adjusting a wave-facing direction of the wave energy conversion component, and a height adjustment component for adjusting a height of the wave energy conversion component sequentially arranged from top down, wherein the wave energy conversion component comprises a mounting base plate, a transmission shaft with two ends thereof arranged on the mounting base plate through transmission shaft supports, a wave energy flap that arranged vertically through the transmission shaft and is able to drive the transmission shaft to rotate under an action of wave kinetic energy, a generator connected with the transmission shaft through a first gear set, a hydraulic oil cylinder positioned on a back surface of the wave energy flap and configured for pushing the wave energy flap to reset, and a wave monitor arranged on the mounting base plate and configured for monitoring a draught and a wave direction angle of the wave energy flap.

2. The adjustable multi-functional bottom-hinged flap-type wave energy utilization device according to claim 1, wherein the first gear set comprises a first gear and a second gear meshed with each other, the first gear is arranged coaxially with the transmission shaft, and the second gear is arranged coaxially with an input shaft of the generator.

3. The adjustable multi-functional bottom-hinged flap-type wave energy utilization device according to claim 1, wherein the wave energy conversion component further comprises a sealing box, the first gear set and the generator are positioned in the sealing box, and the transmission shaft extends into the sealing box to be connected to the first gear set.

4. The adjustable multi-functional bottom-hinged flap-type wave energy utilization device according to claim 1, wherein the direction adjustment component comprises a shell body positioned on the height adjustment component, a first servo motor fixed on the shell body, a worm positioned in the shell body and connected to an output shaft of the first servo motor through a second gear set, a third gear positioned in the shell body and meshed with the worm, and a chuck extending into the third gear and moving synchronously with the third gear, and the chuck is connected to the wave energy conversion component.

5. The adjustable multi-functional bottom-hinged flap-type wave energy utilization device according to claim 4, wherein the second gear set comprises a fourth gear and a fifth gear positioned in the shell body and meshed with each other, the fourth gear is coaxially arranged with an output shaft of the first servo motor, and the fifth gear is coaxially arranged with the worm.

6. The adjustable multi-functional bottom-hinged flap-type wave energy utilization device according to claim 1, wherein the height adjustment component comprises an upper base plate and a lower base plate configured for setting the direction adjustment component, a motor mounting base positioned on the lower base plate, a second servo motor fixed on the motor mounting base, a lead screw connected to an output shaft of the second servo motor through a coupling and vertically arranged, a lead screw nut positioned on a lower surface of the upper base plate and matched with the lead screw, and shearing and inserting type lifting components symmetrically arranged between the upper base plate and the lower base plate.

7. The adjustable multi-functional bottom-hinged flap-type wave energy utilization device according to claim 6, wherein each of the shearing and inserting type lifting components comprises an upper slide rail fixed on the upper base plate, a lower slide rail correspondingly arranged on the lower base plate, roller members that are positioned in the upper slide rail and the lower slide rail and is movable back and forth, and a shearing and inserting type support connected to the roller members and arranged in a crossed manner.

8. The adjustable multi-functional bottom-hinged flap-type wave energy utilization device according to claim 1, wherein a hydraulic oil cylinder with adjustable spacing is connected between the adjacent wave energy conversion devices.

9. The adjustable multi-functional bottom-hinged flap-type wave energy utilization device according to claim 1, wherein the direction adjustment component controls the wave energy conversion component to rotate rightwards until a wave direction angle between the wave energy flap and waves is equal to a set angle when the wave monitor monitors that the wave direction angle is larger than the set angle, the direction adjustment component controls the wave energy conversion component to rotate leftwards until the wave direction angle between the wave energy flap and the waves is equal to the set angle when the wave monitor monitors that the wave direction angle is smaller than the set angle, the height adjustment component controls the wave energy conversion component to rise until the draught of the wave energy flap is equal to a set value when the wave monitor monitors that the draught of the wave energy flap is smaller than the set value, the height adjustment component controls the wave energy conversion component to fall until the draught of the wave energy flap is equal to the set value when the wave monitor monitors that the draught of the wave energy flap is larger than the set value, and the height adjustment component controls the wave energy conversion component to rise until a bottom of wave energy flap is above the water surface when facing rough sea conditions, which are judged by whether the wave energy flap encounters a danger from slamming loads of bigger waves.

10. A control method for the adjustable multi-functional bottom-hinged flap-type wave energy utilization device according to claim 1, the control method comprising the following steps:
- step (1): placing the adjustable multi-functional bottom-hinged flap-type wave energy utilization device in a working sea area with a water depth of 10-20 m, and starting the wave monitor to monitor the draught and a wave direction angle of the wave energy flap;
- step (2): adjusting the hydraulic oil cylinder to increase a spacing between a front one of the wave energy conversion devices and a rear one of the wave energy conversion devices when a wave height or a wave length is larger, and adjusting the hydraulic oil cylinder to reduce the spacing between the front one of the wave energy conversion devices and the rear one of the wave energy conversion devices when the wave height or the wave length is smaller;
- step (3): starting a first servo motor of the direction adjustment component and controlling a chuck to rotate with a cooperation of a second gear set, a worm and a third gear so as to drive the wave energy conversion component to rotate if the wave direction angle is larger than a set angle, wherein the wave energy flap is controlled to rotate rightwards until the wave direction angle of the wave energy flap is equal to the set angle;
- step (4): starting the first servo motor of the direction adjustment component and controlling the chuck to rotate with the cooperation of the second gear set, the worm and the third gear so as to drive the wave energy conversion component to rotate if the wave direction angle is smaller than the set angle, wherein the wave energy conversion component rotates leftwards until the wave direction angle of the wave energy flap is equal to the set angle;
- step (5): determining, by the wave monitor, whether the draught of the wave energy flap is a set value or not, and starting the second servo motor of the height adjustment component and lowering the wave energy converting component until the draught of the wave energy flap is the set value with a cooperation of a lead screw and a lead screw nut if the draught of the wave energy flap is larger than the set value;
- step (6): starting the second servo motor of the height adjustment component and lifting the wave energy converting component by the height adjustment component with the cooperation of the lead screw and the lead screw nut until the draught of the wave energy flap is the set value if the draught of the wave energy flap is smaller than the set value; and
- step (7): starting the second servo motor of the height adjustment component, and lifting the wave energy conversion component by the height adjustment component with the cooperation of the lead screw and the lead screw nut until the wave energy flap is higher than a free liquid level under a rough sea condition.

\* \* \* \* \*